United States Patent
Farah et al.

(10) Patent No.: US 9,759,078 B2
(45) Date of Patent: Sep. 12, 2017

(54) AIRFOIL MODULE

(71) Applicant: United Technologies Corporation, Hartford, CT (US)

(72) Inventors: Jorge Farah, Hartford, CT (US); Gregory E. Reinhardt, South Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 359 days.

(21) Appl. No.: 14/606,542

(22) Filed: Jan. 27, 2015

(65) Prior Publication Data

US 2016/0215641 A1   Jul. 28, 2016

(51) Int. Cl.
  *F01D 11/00*  (2006.01)
  *F01D 9/04*  (2006.01)

(52) U.S. Cl.
  CPC .............. *F01D 11/005* (2013.01); *F01D 9/04* (2013.01); *Y02T 50/672* (2013.01)

(58) Field of Classification Search
  None
  See application file for complete search history.

(56) References Cited

U.S. PATENT DOCUMENTS

| | | | |
|---|---|---|---|
| 4,767,260 A | 8/1988 | Clevenger et al. | |
| 9,194,252 B2 * | 11/2015 | Farah | F01D 25/162 |
| 2012/0274034 A1 * | 11/2012 | Bouchard | F01D 9/04 |
| | | | 277/650 |

FOREIGN PATENT DOCUMENTS

| | | |
|---|---|---|
| EP | 2586993 | 5/2013 |
| WO | 9618025 | 6/1996 |
| WO | 2014116259 | 7/2014 |
| WO | 2014138320 | 9/2014 |
| WO | 2014158278 | 10/2014 |

OTHER PUBLICATIONS

Extended European Search Report dated Jun. 21, 2016 in European Application No. 16152797.3.

* cited by examiner

*Primary Examiner* — Jessica Cahill
*Assistant Examiner* — Daphne M Barry
(74) *Attorney, Agent, or Firm* — Snell & Wilmer L.L.P.

(57) ABSTRACT

An airfoil module may have an outer diameter ring assembly, a vane assembly having a stator vane and an inner diameter ring assembly. The outer diameter ring assembly and the inner diameter ring assembly may be arranged concentrically with the stator vane of the vane assembly extending between them. The inner diameter ring assembly may have a first inner diameter ring section sealing end and a second inner diameter ring section sealing end. A feather seal may be disposed along the first inner diameter ring section sealing end. A stator ring assembly may comprise multiple airfoil modules arranged in an annulus. The outer diameter ring assemblies may be joined together by brazing or welding, or may share a unified outer diameter ring assembly. The inner diameter ring assemblies may abut feather seals so that the airfoil modules may expand and contract independently along the inner diameter ring assemblies.

18 Claims, 4 Drawing Sheets

AIRFOIL MODULE

FIELD

The present disclosure relates generally to a gas turbine engine, and more specifically, to airfoils such as rotor blades and/or stator vanes.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and, optionally, an electric generator to generate mechanical and/or electrical power.

The efficiency of the engine can be increased by passing a higher temperature gas flow through the turbine. However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow. The leading edge of the vane and blade airfoils is exposed to high temperature gas flow. As a result, the airfoils experience structural loads from thermal expansion/contraction, as well as from fluid forces. The airfoils are desired to be retained in substantially fixed position in order to bear the structural loads. However, the airfoils are also desired to be permitted to move to ameliorate stress and/or strain resulting from thermal expansion/contraction and potential bending and/or cracking.

SUMMARY

The forgoing features and elements may be combined in various combinations without exclusivity, unless expressly indicated herein otherwise. These features and elements as well as the operation of the disclosed embodiments will become more apparent in light of the following description and accompanying drawings.

An airfoil module is disclosed. The airfoil module may include an outer diameter ring assembly. The airfoil module may also include a vane assembly. The vane assembly may have a stator vane disposed radially inward of the outer diameter ring assembly and supported by the outer diameter ring assembly. The airfoil module may include an inner diameter ring assembly disposed radially inward of the vane assembly and including a first inner diameter ring section sealing end and a second inner diameter ring section sealing end. Furthermore, the airfoil module may include a feather seal disposed along the first inner diameter ring section sealing end. The outer diameter ring assembly may further include casing attachment supports.

In various embodiments, the feather seal may be metal. In various other embodiments, the feather seal may be a composite.

The stator vane may extend radially between the outer diameter ring assembly and the inner diameter ring assembly, and may be formed from a unitary piece of material with at least one of the outer diameter ring assembly or the inner diameter ring assembly. Moreover, the vane assembly may include a second stator vane.

Additionally, the outer diameter ring assembly may be an annulus and the inner diameter ring assembly may be a partial annulus disposed concentrically inward of the outer diameter ring assembly. As used herein, a "partial annulus" comprises an annular section that forms less than a complete circle. Furthermore, the outer diameter ring assembly may include a first outer diameter ring section sealing end, and a second outer diameter ring section sealing end. The first outer diameter ring section sealing end and the second outer diameter ring section sealing end may be disposed at opposite circumferentially outboard ends of the outer diameter ring assembly. In some embodiments, the first outer diameter ring section sealing end is a non-discontinuous edge. In various embodiments, the first outer diameter ring section sealing end of the outer diameter ring assembly of the airfoil module is configured to be at least at least one of brazed and welded to the second outer diameter ring section sealing end of an outer diameter ring assembly of a second airfoil module.

A stator ring assembly is also disclosed. The stator ring assembly may include a first airfoil module and a second airfoil module. Each airfoil module may include an outer diameter ring assembly, a vane assembly having a stator vane disposed radially inward of the outer diameter ring assembly and supported by the outer diameter ring assembly, an inner diameter ring assembly disposed radially inward of the vane assembly and including a first inner diameter ring section sealing end and a second inner diameter ring section sealing end, and a feather seal disposed along the first inner diameter ring section sealing end. The first airfoil module may be located annularly adjacent to the second airfoil module and the feather seal may be disposed between the first inner diameter ring section sealing end of the first airfoil module and the second inner diameter ring section sealing end of the second airfoil module. The outer diameter ring assembly may further include casing attachment supports.

In various embodiments, the feather seal may be metal. In various other embodiments, the feather seal may be a composite.

The stator vane may extend radially between the outer diameter ring assembly and the inner diameter ring assembly, and may be formed from a unitary piece of material with at least one of the outer diameter ring assembly or the inner diameter ring assembly. Moreover, the vane assembly may include a second stator vane.

Additionally, the outer diameter ring assembly may be an annulus and the inner diameter ring assembly may be a partial annulus disposed concentrically inward of the outer diameter ring assembly. Furthermore, the outer diameter ring assembly may include a first outer diameter ring section sealing end, and a second outer diameter ring section sealing end. The first outer diameter ring section sealing end and the second outer diameter ring section sealing end may be disposed at opposite circumferentially outboard ends of the outer diameter ring assembly. In some embodiments, the first outer diameter ring section sealing end is a non-discontinuous edge. In various embodiments, the first outer diameter ring section sealing end of the outer diameter ring assembly of the airfoil module is configured to be at least at least one of brazed and welded to the second outer diameter ring section sealing end of a outer diameter ring assembly of a second airfoil module.

In various embodiments, the stator ring assembly further includes a third airfoil module located annularly adjacent to the first airfoil module, wherein a first outer diameter ring section sealing end of the third airfoil module is at least one of brazed and welded to a second outer diameter ring section sealing end of the first airfoil module. and wherein a second inner diameter ring sealing end of the third airfoil module is at least one of brazed and welded to a second inner diameter ring section sealing end of the first airfoil module.

A method of forming an airfoil module is disclosed. The method may include forming an outer diameter ring assembly, forming a vane assembly including a stator vane disposed radially inward of the outer diameter ring assembly and supported by the outer diameter ring assembly, forming an inner diameter ring assembly disposed radially inward of the vane assembly and including a first inner diameter ring section sealing end and a second inner diameter ring section sealing end, and attaching a feather seal along the first inner diameter ring section sealing end.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
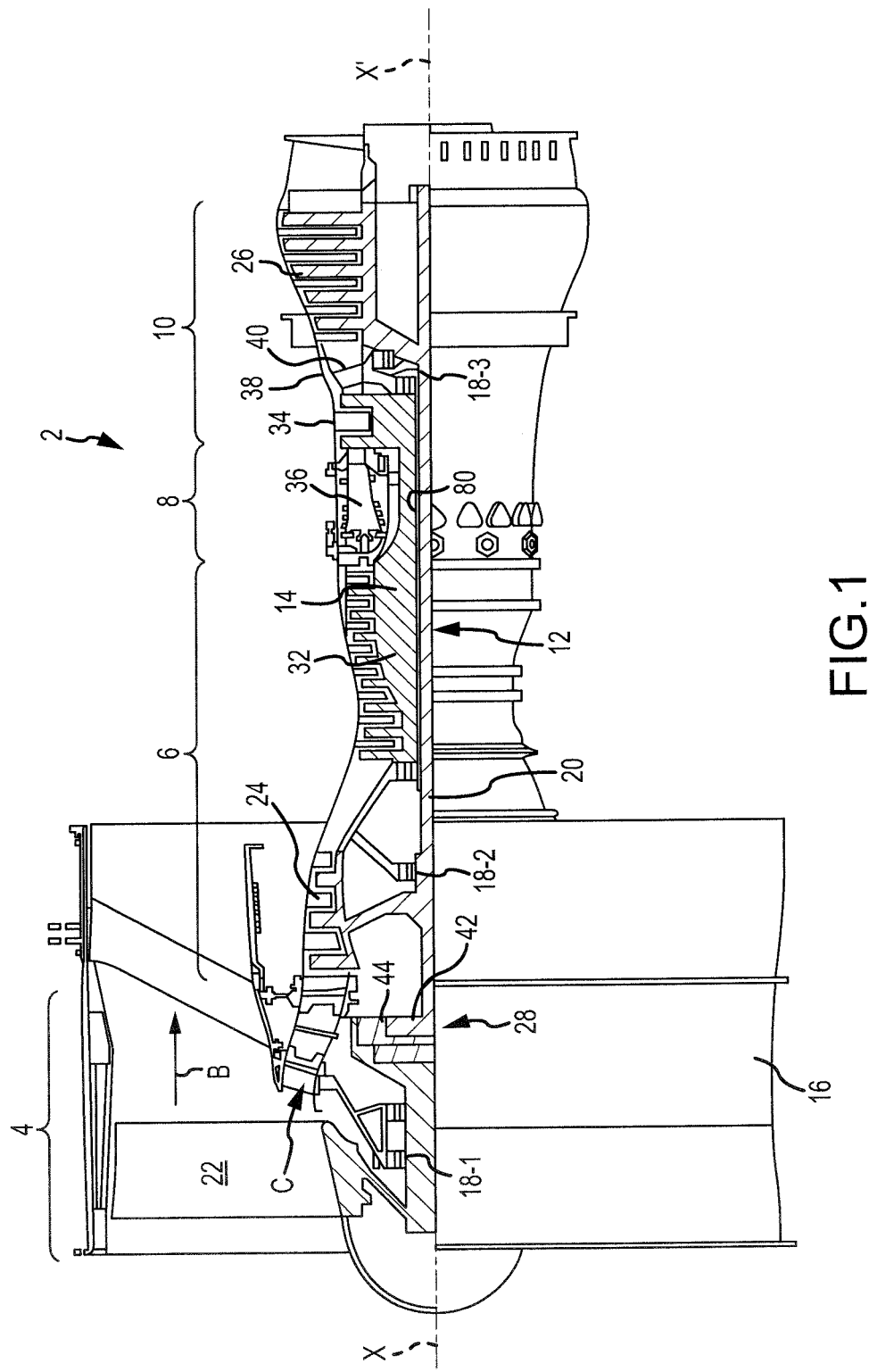
FIG. 1 illustrates cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice embodiments of the disclosure, it should be understood that other embodiments may be realized and that logical changes and adaptations in design and construction may be made in accordance with this invention and the teachings herein. Thus, the detailed description herein is presented for purposes of illustration only and not limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step. Surface shading lines may be used throughout the figures to denote different parts but not necessarily to denote the same or different materials.

As used herein, "aft" refers to the direction associated with the exhaust (e.g., the back end) of a gas turbine engine.

As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that a first component is positioned at a greater distance away from the engine central longitudinal axis, than the second component. A first component that is "radially inward" of a second component means that the first component is positioned closer to the engine central longitudinal axis, than the second component. In the case of components that rotate circumferentially about the engine central longitudinal axis, a first component that is radially inward of a second component rotates through a circumferentially shorter path than the second component.

A first component that is "axially forward" of a second component means that a first component is positioned nearer to the leading edge and farther from the trailing edge of a rotating structure, than the second component. A first component that is "axially aft" of a second component means that the first component is positioned farther from the leading edge and nearer to the trailing edge of a rotating structure, than the second component.

Figure 2:
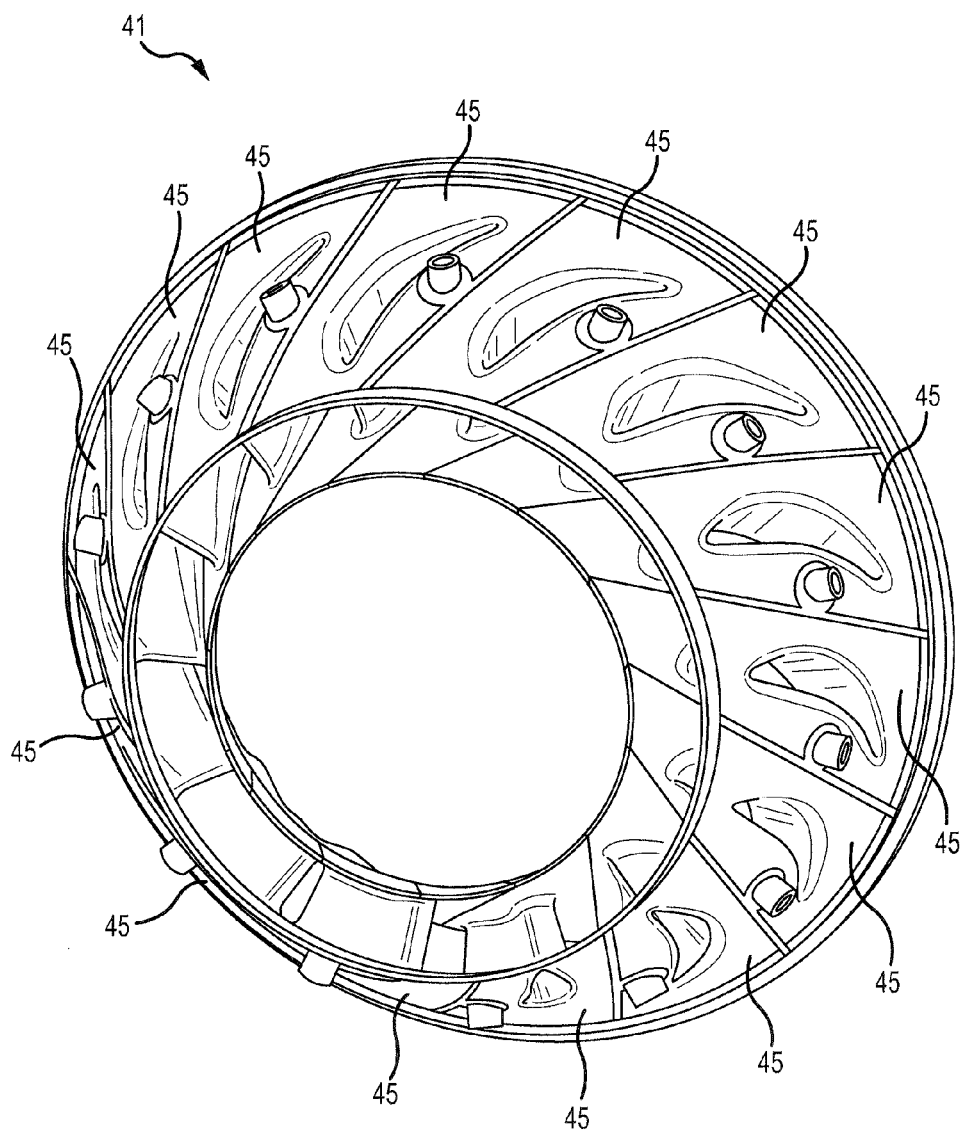
FIG. 2 illustrates a stator ring assembly comprising airfoil modules, in accordance with various embodiments.

In various embodiments and with reference to FIGS. 1 and 2, an exemplary gas turbine engine 2 is provided. Gas turbine engine 2 may be a two-spool turbofan that generally incorporates a fan section 4, a compressor section 6, a combustor section 8 and a turbine section 10. Alternative engines may include, for example, an augmentor section among other systems or features. In operation, fan section 4 can drive air along a bypass flow-path B while compressor section 6 can drive air along a core flow-path C for compression and communication into combustor section 8 then expansion through turbine section 10. Although depicted as a turbofan gas turbine engine 2 herein, it should be understood that the concepts described herein are not limited to use with turbofans as the teachings may be applied to other types of turbine engines including three-spool architectures.

Gas turbine engine 2 may generally comprise a low speed spool 12 and a high speed spool 14 mounted for rotation about an engine central longitudinal axis X-X' relative to an engine static structure 16 via several bearing systems 18-1, 18-2, and 18-3. It should be understood that various bearing systems at various locations may alternatively or additionally be provided, including for example, bearing system 18-1, bearing system 18-2, and bearing system 18-3.

Low speed spool 12 may generally comprise an inner shaft 20 that interconnects a fan 22, a low pressure compressor section 24 (e.g., a first compressor section) and a low pressure turbine section 26 (e.g., a first turbine section). Inner shaft 20 may be connected to fan 22 through a geared architecture 28 that can drive the fan 22 at a lower speed than low speed spool 12. Geared architecture 28 may comprise a gear assembly 42 enclosed within a gear housing 44. Gear assembly 42 couples the inner shaft 20 to a rotating fan structure. High speed spool 14 may comprise an outer shaft 30 that interconnects a high pressure compressor section 32 (e.g., second compressor section) and high pressure turbine section 34 (e.g., second turbine section). A combustor 36 may be located between high pressure compressor section 32 and high pressure turbine section 34. A mid-turbine frame 38 of engine static structure 16 may be located generally between high pressure turbine section 34 and low pressure turbine section 26. Mid-turbine frame 38 may support one or more bearing systems 18 (such as 18-3) in turbine section 10. Inner shaft 20 and outer shaft 30 may be concentric and rotate via bearing systems 18 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 24 then high pressure compressor section 32, mixed and burned with fuel in combustor 36, then expanded over high pressure turbine section 34 and low pressure turbine section 26. Mid-turbine frame 38 includes airfoils 40, which are in the core airflow path. Turbines 26, 34 rotationally drive the respective low speed spool 12 and high speed spool 14 in response to the expansion.

Gas turbine engine 2 may be, for example, a high-bypass geared aircraft engine. In various embodiments, the bypass ratio of gas turbine engine 2 may be greater than about six (6). In various embodiments, the bypass ratio of gas turbine engine 2 may be greater than ten (10). In various embodiments, geared architecture 28 may be an epicyclic gear train, such as a star gear system (sun gear in meshing engagement with a plurality of star gears supported by a carrier and in meshing engagement with a ring gear) or other gear system. Geared architecture 28 may have a gear reduction ratio of greater than about 2.3 and low pressure turbine section 26 may have a pressure ratio that is greater than about 5. In various embodiments, the bypass ratio of gas turbine engine 2 is greater than about ten (10:1). In various embodiments, the diameter of fan 22 may be significantly larger than that of the low pressure compressor section 24, and the low pressure turbine section 26 may have a pressure ratio that is greater than about 5:1. Low pressure turbine section 26 pressure ratio may be measured prior to inlet of low pressure turbine section 26 as related to the pressure at the outlet of low pressure turbine section 26 prior to an exhaust nozzle. It should be understood, however, that the above parameters are exemplary of various embodiments of a suitable geared architecture engine and that the present disclosure contemplates other turbine engines including direct drive turbofans.

In various embodiments, the next generation of turbofan engines may be designed for higher efficiency, which may be associated with higher pressure ratios and higher temperatures in the high speed spool 14. These higher operating temperatures and pressure ratios may create operating environments that may cause thermal loads that are higher than thermal loads conventionally encountered, which may shorten the operational life of current components.

In various embodiments, high speed spool 14 may comprise alternating rows of rotating rotors and stationary stators. Stators may have a cantilevered configuration or a shrouded configuration. More specifically, stator may comprise an airfoil, such as a stator vane, a casing support and a hub support. In this regard, stator may be supported along an outer diameter by a casing support and along an inner diameter by a hub support. In contrast, a cantilevered stator may comprise a stator vane that is only retained and/or supported at the casing (e.g., along an outer diameter).

In various embodiments, airfoils such as rotors may be configured to compress and spin a fluid flow. Stators may be configured to receive and straighten the fluid flow. In operation, the fluid flow discharged from the trailing edge of stators may be straightened (e.g., the flow may be directed in a substantially parallel path to the centerline of the engine and/or high pressure section) to increase and/or improve the efficiency of the engine and, more specifically, to achieve maximum and/or near maximum compression and efficiency when the straightened air is compressed and spun by rotor(s).

Operating conditions in high pressure compressor section 32 may be approximately 1400° F. (approximately 760° C.) or more. As noted above rotor blades and stator vanes are subject to a high external heat load that is localized to the stagnation location, which is where the hot combustion gases impinge on the airfoil.

As such, cooling holes may be positioned in the surface of at least one of the blades and the vanes. Cooling air may be ejected from the cooling holes. The cooling holes may be configured to produce a layer of cooling air that flows over the leading edge surface and/or other surfaces to protect the metal surface from exposure to the high temperature hot gas flow. The cooling air may be ejected in a radial direction and/or an axial direction of the blade or vane. A portion of the cooling air will thus migrate onto the leading edge surface of the blade or vane to provide a layer of cooling air.

Moreover, cooling channels may be positioned within the interior volume of at least one of the blades or vanes. Cooling air may be conducted through the cooling channels in route to the cooling holes. The cooling channels may be configured to conduct heat from the blades and/or vane, to the cooling air flowing through the cooling channel to protect the blade and/or vane from overheating.

With reference to FIG. 2, in various embodiments, a stator ring assembly 41 is disclosed. A stator ring assembly 41 may comprise a plurality of airfoil modules 45. The airfoil modules 45 may be arranged circularly to form an annulus. In various embodiments, fourteen airfoil modules 45 are arranged circularly to form an annulus, although any number of airfoil modules 45 may be arranged to form an annulus of any size, as desired. Moreover, a stator ring assembly 41 may comprise a substantially cylindrical annulus. Furthermore, a stator ring assembly 41 may comprise a conic annulus. In further embodiments, a stator ring assembly 41 may comprise an annulus having curvature along the central axis, such as an axis superimposed with the longitudinal engine axis X-X'. Moreover, a stator ring assembly 41 may comprise an annulus approximating a conic section along the central axis, for instance, an annulus that tapers (e.g., has a varying circumference) along the central axis, such as an axis superimposed with the longitudinal engine axis X-X'. The stator ring assembly 41 may taper from a lesser circumference to a greater circumference going from forward to aft end of the stator ring assembly 1.

Figure 3:
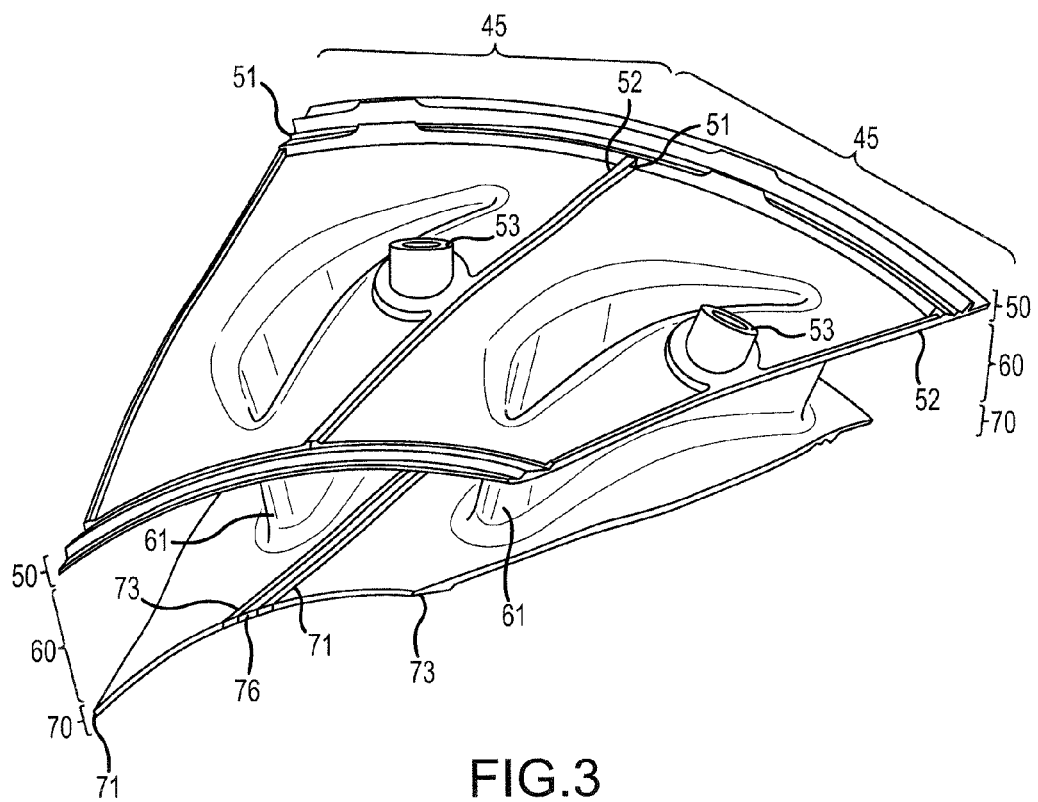
FIG. 3 illustrates an detailed view of two airfoil modules in accordance with various embodiments.

With attention now to FIGS. 2 and 3, an airfoil module 45 is depicted. An airfoil module 45 may comprise an outer diameter ring assembly 50, a vane assembly 60, and an inner diameter ring assembly 70. The airfoil module 45 may be configured to interface with adjacent airfoil modules 45 at each of its circumferential ends. An airfoil module 45 may be joined at various locations to an adjacent airfoil module 45. Similarly, an airfoil module 45 may substantially abut an adjacent airfoil module 45, for instance, having a seal placed between both airfoil modules 45, but neither airfoil module 45 being joined to the other at the seal, but abutting at the seal. In this manner, different portions of different airfoil modules 45 may thermally expand at different rates. For instance, each airfoil module 45 may be joined together at the outer diameter ring assembly 50, while abutting, having a seal placed between both airfoil modules 45, at the inner diameter ring assembly 70. In further embodiments, each airfoil module 45 may be joined together at the outer diameter ring assembly 50, while some airfoil modules may be abutting, having a seal placed between both airfoil modules 45, at the inner diameter ring assembly 70, and other airfoil modules 45 may be joined together at the inner diameter ring assembly 70. For example, every third airfoil module 45 may be abutting to every fourth airfoil module 45, having a seal placed between both airfoil modules 45 at the inner diameter ring assembly 70. In various embodiments, the airfoil modules 45 all share a one piece unitary outer diameter ring assembly 50 that forms a complete annulus. Alternatively, each airfoil module 45 has its own outer diameter ring assembly 50 that is permanently bonded, for instance, brazed or welded or riveted, to the outer diameter ring assemblies 50 of adjacent airfoil modules 45. In this manner, the airfoil modules 45 may expand and contract independently at the abutting inner diameter ring assemblies 70, and yet be retained in substantially fixed position within the turbine engine 2 by the variously joined outer diameter ring assembly 50.

An outer diameter ring assembly 50 may comprise an annular section having an arc length comprising a portion of a circle centered on the longitudinal engine axis X-X' and connecting or integrally formed with the vane assembly 60 along the circumferentially outermost portion of the vane assembly 60. The outer diameter ring assembly 50 may comprise a first outer diameter ring section sealing end 51 and a second outer diameter ring section sealing end 52. The first outer diameter ring section sealing end 51 and the second outer diameter ring section sealing end 52 may be disposed at opposite circumferentially outboard ends of the outer diameter ring assembly 50. The outer diameter ring assembly 50 may comprise casing support attachment points 53. Thus, the outer diameter ring assembly 50 may attach to other engine structures, such as an engine casing whereby the airfoil module 45, and thus the stator ring assembly 1 is retained in position relative to the gas turbine engine 2.

A vane assembly 60 may comprise one or more airfoils disposed radially inward of the outer diameter ring assembly 50. In various embodiments, the airfoils are vanes 61. The vane assembly 60 may comprise one vane 61. As such, the vane assembly 60 may be termed a "singlet." In further embodiments, the vane assembly 60 may comprise two vanes 61. As such, the vane assembly 60 may be termed a "doublet." Furthermore, the vane assembly 60 may comprise three vanes 61, and thus be termed a "triplet." As such, a vane assembly 60 may comprise any desired number of vanes. The vane assembly 60 may comprise one or more vanes 61 disposed radially between the outer diameter ring assembly 50 and the inner diameter ring assembly 70. The inner diameter ring assembly 70 may have a smaller diameter than the outer diameter ring assembly 50, so that the outer diameter ring assembly 50 is radially outboard of the inner diameter ring assembly 70, and the outer diameter ring assembly 50 and inner diameter ring assembly 70 are concentric annuli. The vane assembly 60 is disposed between the outer diameter ring assembly 50 and the inner diameter ring assembly 70 and may comprise one or more vanes 61 extending radially between the outer diameter ring assembly 50 and the inner diameter ring assembly 70. The vane assembly 60 may be formed form a unitary piece of material with one or both of the inner diameter ring assembly 70 and outer diameter ring assembly 50. Alternatively, the vane assembly 60 may be joined with one or both of the inner diameter ring assembly 70 and outer diameter ring assembly 50 by fasteners, welds, brazing, bonding, or any other attachment mechanism.

An inner diameter ring assembly 70 may comprise an annular section having an arc length comprising a portion of a circle (e.g., a "partial annulus") centered on the longitudinal engine axis X-X' and connecting or integrally formed with the vane assembly 60 along the circumferentially innermost portion of the vane assembly 60. The inner diameter ring assembly 70 may comprise a first inner diameter ring section sealing end 71 and a second outer diameter ring section sealing end 73. The first inner diameter ring section sealing end 71 and the second inner diameter ring section sealing end 73 may be disposed at opposite circumferentially outboard ends of the inner diameter ring assembly 70.

Having discussed various aspects of an airfoil module 45, attention is directed to the first outer diameter ring section sealing end 51 of the outer diameter ring assembly 50. The first outer diameter ring section sealing end 51 may comprise a non-discontinuous edge extending parallel to a line disposed normal to the sectional plane of the airfoil module 45. In further embodiments, the first outer diameter ring section sealing end 51 may comprise a non-discontinuous edge extending at an angle relative to the sectional plane of the airfoil module 45, for example, in airfoil modules 45 comprising an annulus with longitudinal curvature and/or longitudinal tapering. Moreover, the first outer diameter ring section sealing end 51 may comprise local discontinuities which are complimentary to those of an adjacent air foil to enhance the positioning of adjacent airfoil modules 45.

The second outer diameter ring section sealing end 52 may comprise a non-discontinuous edge extending parallel to a line disposed normal to the sectional plane of the airfoil module 45. In further embodiments, the second outer diameter ring section sealing end 52 may comprise a non-discontinuous edge extending at an angle relative to the sectional plane of the airfoil module 45, for example, in airfoil modules 45 comprising an annulus with longitudinal curvature and/or longitudinal tapering. Moreover, the second outer diameter ring section sealing end 52 may comprise local discontinuities, such as to enhance the positioning of adjacent airfoil modules 45.

Having discussed various aspects of an airfoil module 45 and the outer diameter ring assembly 50, attention is directed to the first inner diameter circumferential sealing end of the inner diameter ring assembly 70. The first inner diameter ring section sealing end 71 may comprise a non-discontinuous edge extending parallel to a line disposed normal to the sectional plane of the airfoil module 45. In further embodiments, the first inner diameter ring section sealing end 71 may comprise a non-discontinuous edge extending at an angle relative to the sectional plane of the airfoil module 45, for example, in airfoil modules 45 comprising an annulus with longitudinal curvature and/or longitudinal tapering. Moreover, the first inner diameter ring section sealing end 71 may comprise local discontinuities, so as to enhance the positioning of adjacent airfoil modules 45 by registering the alignment of the adjacent airfoil modules.

The second inner diameter ring section sealing end 73 may comprise a non-discontinuous edge extending parallel to a line disposed normal to the sectional plane of the airfoil module 45. In various embodiments, the second inner diameter ring section sealing end 73 may comprise a non-discontinuous edge extending at an angle relative to the sectional plane of the airfoil module 45, for example, in airfoil modules 45 comprising an annulus with longitudinal curvature and/or longitudinal tapering. Moreover, the second inner diameter ring section sealing end 73 may comprise local discontinuities, so as to enhance the positioning of adjacent airfoil modules 45.

As discussed, the vane assembly 60 may comprise one or more airfoils, such as a vane 61. A vane 61 may have a chord extending substantially along the longitudinal axis of the airfoil module 45 (e.g., oriented substantially along an axis parallel to or at an acute angle to the longitudinal engine axis X-X'). The chord may be angled to have an angle of attack relative to the direction of airflow through the vane assembly 60 and generally aligned longitudinally through the vane assembly 60.

The airfoil module 45 may also comprise one or more feather seal 76. A feather seal 76 may comprise a seal such as a metal gasket. The feather seal 76 may comprise a shim, or a composite gasket, or any other apparatus whereby unwanted fluid flow may be ameliorated. The feather seal 76 may be disposed between a first inner diameter ring section sealing end 71 of a first airfoil module 45, and a second inner diameter ring section sealing end 73 of an adjacent airfoil module 45. Because a plurality of airfoil modules 45 are assembled to form a ring 1, a one or more first inner diameter ring section sealing end 71 of an airfoil module 45 may be positioned adjacent to one or more second inner diameter section sealing end of another airfoil module 45. Because the airfoil modules 45 undergo thermal expansion and contraction, the space between these inner diameter ring section sealing ends 71, 73 may vary. By maintaining a space between the inner diameter ring section sealing ends 71, 73, stress and strain exerted from one airfoil module 45 to another during thermal expansion/contraction may be ameliorated, however, such a space may permit air passing through the engine to leak between the inner diameter ring section sealing ends 71, 73. As such, a feather seal 76 may be disposed between the inner diameter ring section sealing ends 71, 73, thus ameliorating the air leakage, while yet permitting expansion and contraction of the space between the inner diameter ring section sealing ends 71, 73. Thus, the feather seal 76 may comprise a compressible material. The feather seal 76 may comprise metal, or composite, or any material and configuration at least one of enhancing the distribution of structural loads throughout the ring 1 and/or airfoil module(s) 2, ameliorating localized bending, and diminishing load concentration. As such, cracking, bending, metal fatigue, and localized wear may be diminished.

Figure 4:
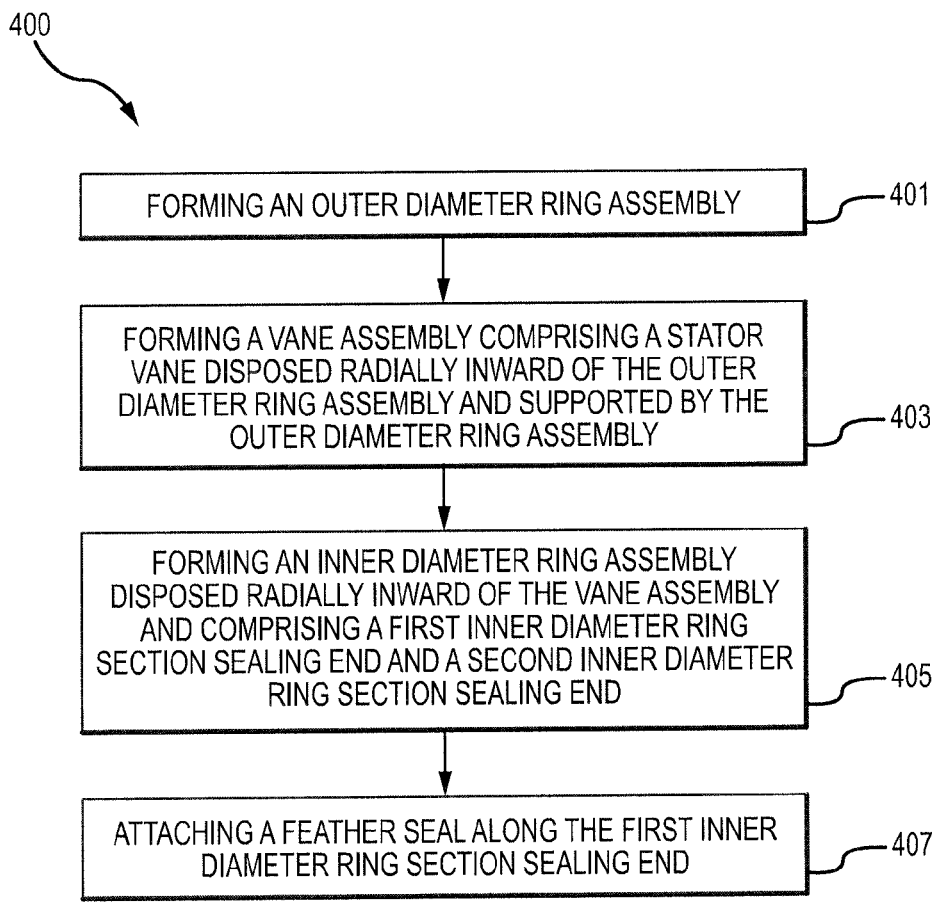
FIG. 4 depicts a flowchart illustrating a method of forming an airfoil module, in accordance with various embodiments.

Methods of forming an airfoil module 45 are also presented. For instance, with reference to FIG. 4, a method 400 of forming an airfoil module may include forming an outer diameter ring assembly (Step 401). The method may further include forming a vane assembly comprising a stator vane disposed radially inward of the outer diameter ring assembly and supported by the outer diameter ring assembly (Step 403), and forming an inner diameter ring assembly disposed radially inward of the vane assembly and comprising a first inner diameter ring section sealing end and a second inner diameter ring section sealing end (Step 405). Moreover, a feather seal may be attached along the first inner diameter ring section sealing end (Step 407). As used herein, "forming" may include at least one of casting, extrusion, milling, cutting, welding, brazing, or any other appropriate technique or combination of techniques.

Having discussed various aspects of an airfoil module 45, an airfoil module 45 may be made of many different materials or combinations of materials. For example, various components of the system may be made from metal. For example, various aspects of an airfoil module 45 may comprise metal, such as titanium, aluminum, steel, or stainless steel, though it may alternatively comprise numerous other materials configured to provide support, such as, for example, composite, ceramic, plastics, polymers, alloys, glass, binder, epoxy, polyester, acrylic, or any material or combination of materials having desired material properties, such as heat tolerance, strength, stiffness, or weight. In various embodiments, various portions of an airfoil module 45 as disclosed herein are made of different materials or combinations of materials, and/or may comprise coatings.

In various embodiments, an airfoil module 45 may comprise multiple materials, or any material configuration suitable to enhance or reinforce the resiliency and/or support of the system when subjected to wear in an aircraft operating environment or to satisfy other desired electromagnetic, chemical, physical, or material properties, for example radar signature, weight, flexibility, strength, or heat tolerance.

In various embodiments, various components may comprise an austenitic nickel-chromium-based alloy such as Inconel®, which is available from Special Metals Corporation of New Hartford, N.Y., USA. In various embodiments, various components may comprise ceramic matrix composite (CMC). Moreover, various aspects may comprise refractory metal, for example, an alloy of titanium, for example titanium-zirconium-molybdenum (TZM).

Various benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting. For example, while the discussion herein has been focused on airfoils comprising stator vanes, as also mentioned, the various features and elements may be implemented in airfoils comprising rotor vanes, or any desired airfoil.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An airfoil module comprising:
an outer diameter ring assembly comprising:
a first outer diameter ring section sealing end; and
a second outer diameter ring section sealing end;
wherein the first outer diameter ring section sealing end and the second outer diameter ring section sealing end are disposed at opposite circumferentially outboard ends of the outer diameter ring assembly, and the first outer diameter ring section sealing end is configured to be permanently bonded to an outer diameter ring section sealing end of a second outer diameter ring assembly of a second airfoil module;
a vane assembly comprising a stator vane disposed radially inward of the outer diameter ring assembly and supported by the outer diameter ring assembly;
an inner diameter ring assembly disposed radially inward of the vane assembly and comprising a first inner diameter ring section sealing end and a second inner diameter ring section sealing end; and
a feather seal disposed along the first inner diameter ring section sealing end.

2. The airfoil module according to claim 1, the outer diameter ring assembly further comprising casing attachment supports.

3. The airfoil module according to claim 1, wherein the feather seal comprises metal.

4. The airfoil module according to claim 1, wherein the feather seal comprises a composite.

5. The airfoil module according to claim 1, the stator vane extending radially between the outer diameter ring assembly and the inner diameter ring assembly, and formed from a unitary piece of material with at least one of the outer diameter ring assembly or the inner diameter ring assembly.

6. The airfoil module according to claim 1, wherein the vane assembly comprises a second stator vane.

7. The airfoil module according to claim 1, the outer diameter ring assembly comprising an annulus and the inner diameter ring assembly comprising a partial annulus disposed concentrically inward of the outer diameter ring assembly.

8. The airfoil module according to claim 1, wherein the first outer diameter ring section sealing end comprising a non-discontinuous edge.

9. A stator ring assembly comprising:
a first airfoil module and a second airfoil module, each comprising:
an outer diameter ring assembly;
a vane assembly comprising a stator vane disposed radially inward of the outer diameter ring assembly and supported by the outer diameter ring assembly;
an inner diameter ring assembly disposed radially inward of the vane assembly and comprising a first inner diameter ring section sealing end and a second inner diameter ring section sealing end; and
a feather seal disposed along the first inner diameter ring section sealing end,
wherein the first airfoil module is located annularly adjacent to the second airfoil module,
wherein the feather seal is disposed between the first inner diameter ring section sealing end of the first airfoil module and the second inner diameter ring section sealing end of the second airfoil module,
wherein the outer diameter ring assembly of the first airfoil module is permanently bonded to the outer diameter ring assembly of the second airfoil module.

10. The stator ring assembly according to claim 9, wherein the feather seal comprises at least one of a metal or a composite.

11. The stator ring assembly according to claim 9, the stator vane extending radially between the outer diameter ring assembly and the inner diameter ring assembly, and formed from a unitary piece of material with at least one of the outer diameter ring assembly or the inner diameter ring assembly.

12. The stator ring assembly according to claim 9, the vane assembly comprising a second stator vane.

13. The stator ring assembly according to claim 9, wherein the outer diameter ring assembly comprises:
a first outer diameter ring section sealing end; and
a second outer diameter ring section sealing end,
the first outer diameter ring section sealing end and the second outer diameter ring section sealing end disposed at opposite circumferentially outboard ends of the outer diameter ring assembly.

14. The stator ring assembly according to claim 13, the first outer diameter ring section sealing end of the first airfoil module at least one of brazed and welded to the second outer diameter ring section sealing end of the second airfoil module.

15. The stator ring assembly according to claim 14, the stator ring assembly further comprising a third airfoil module located annularly adjacent to the first airfoil module,
wherein a first outer diameter ring section sealing end of the third airfoil module is at least one of brazed and welded to a second outer diameter ring section sealing end of the first airfoil module, and
wherein a second inner diameter ring sealing end of the third airfoil module is at least one of brazed and welded to a second inner diameter ring section sealing end of the first airfoil module.

16. The stator ring assembly according to claim 9, the outer diameter ring assembly further comprising casing attachment supports.

17. The stator ring assembly according to claim 9, the outer diameter ring assembly comprising an annulus and the inner diameter ring assembly comprising a partial annulus disposed concentrically inward of the outer diameter ring assembly.

18. A method of forming an airfoil module comprising:
forming an outer diameter ring assembly;
forming a vane assembly comprising a stator vane disposed radially inward of the outer diameter ring assembly and supported by the outer diameter ring assembly;
forming an inner diameter ring assembly disposed radially inward of the vane assembly and comprising a first inner diameter ring section sealing end and a second inner diameter ring section sealing end; and attaching a feather seal along the first inner diameter ring section sealing end, wherein the outer diameter ring assembly comprises:
- a first outer diameter ring section sealing end; and
- a second outer diameter ring section sealing end, the first outer diameter ring section sealing end and the second outer diameter ring section sealing end disposed at opposite circumferentially outboard ends of the outer diameter ring assembly;

wherein the first outer diameter ring section sealing end of the first airfoil module is permanently bonded to the second outer diameter ring section sealing end of the second airfoil module.

* * * * *